US006968344B2

United States Patent
Bahulkar et al.

(10) Patent No.: US 6,968,344 B2
(45) Date of Patent: Nov. 22, 2005

(54) METHOD AND APPARATUS FOR OBJECT-ORIENTED ACCESS TO A RELATIONAL DATABASE MANAGEMENT SYSTEM (RDBMS) BASED ON ANY ARBITRARY PREDICATE

(75) Inventors: Arun Gajanan Bahulkar, Pune (IN); Vilas Sadanand Prabhu, Columbus (IN)

(73) Assignee: Tata Consultancy Services Limited, Nariman Point Mumbai (IN)

( * ) Notice: Subject to any disclaimer, the term of this patent is extended or adjusted under 35 U.S.C. 154(b) by 576 days.

(21) Appl. No.: 10/071,981

(22) Filed: Feb. 5, 2002

(65) Prior Publication Data

US 2003/0033277 A1 Feb. 13, 2003

(30) Foreign Application Priority Data

Jul. 26, 2001 (IN) .................................. 720/MUM/2001

(51) Int. Cl.[7] .............................................. G06F 17/30
(52) U.S. Cl. ......................................... 707/103; 707/3
(58) Field of Search .................. 707/1–10, 100–104.1, 707/200–208

(56) References Cited

U.S. PATENT DOCUMENTS 6,684,219 B1 * 1/2004 Shaw et al. ............. 707/103 R
6,704,747 B1 * 3/2004 Fong ....................... 707/104.1
6,748,374 B1 * 6/2004 Madan et al. ................. 707/3

OTHER PUBLICATIONS

IN 720/MUM/2001.

* cited by examiner

Primary Examiner—Mohammad Ali
(74) Attorney, Agent, or Firm—Donald R. Boys; Central Coast Patent Agency Inc.

(57) ABSTRACT

A control system for enabling user access of data records stored in a relational database in an object oriented way has a first object model representing a class mapped to a table in the relational database, a second object model representing a query object modeled after the first object model according to the same modeling framework, a software parser for reading the information contained in the first and second object models, a model generator for building a representative model from aggregated information from the first and second models, and a code generator for scanning the representative model and generating the appropriate application code for each node in the representative model. The system is characterized in that a user supplies the input parameters for accessing the records desired from the database into a text receptacle of the second object model and executes the model causing subsequent application code-generation processing that drives the access to the records in the ordered manner, the records served as an object or objects to a user program from which such records were retrieved in a fashion requested and interpretable by the user program.

9 Claims, 3 Drawing Sheets

METHOD AND APPARATUS FOR OBJECT-ORIENTED ACCESS TO A RELATIONAL DATABASE MANAGEMENT SYSTEM (RDBMS) BASED ON ANY ARBITRARY PREDICATE

FIELD OF THE INVENTION

The present invention is in the field of object modeling as it applies to software systems, and pertains more particularly to methods and apparatus enabling object-oriented access to a relational database management system (RDBMS) based on any arbitrary predicate.

CROSS-REFERENCE TO RELATED DOCUMENTS

The present patent application claims priority to foreign provisional patent application serial number 720/MUM/2001 filed in India on Jul. 26, 2001. The prior application is incorporated herein in its entirety by reference.

BACKGROUND OF THE INVENTION

In the development and management of complex software systems, Object Oriented Programming (OOP) has become commonplace. OOP is a type of data programming in which programmers define not only the data type of a data structure, but also types of operation or methods that can be applied to the data structure. Through object modeling, a software system is described as a set of objects. Objects are programming abstractions that have identity, behavior, and state. Objects can have relationships or associations between one another. Also, objects can inherit characteristics, sometimes referred to as attributes from other objects. Object oriented programming requires an object-oriented programming language (OOPL). JAVA™, C++™ and SMALLTALK™ are three of the better known languages used. There are also object-oriented versions of PASCAL™.

A typical multi-tier client-server software system exhibits four predominant and distinct software layers. These are a presentation layer, a middleware layer, an application layer, and a persistence layer. Object orientation has been successfully applied primarily to the presentation and application layer of the above-mentioned software layers. There are "new component" based object modeling standards available such as (D) COM or CORBA that address object orientation in the middleware layer of a software system. In current sate-of-art technology however, the persistence layer of a software system is not addressed adequately in terms of object-orientation. Therefore, most applications still use relational database management systems (RDBMS) in the persistence layer of a complex software system.

A RDBMS models data using relational algebra. Relational modeling works in terms of truth predicates. A truth predicate defines what attributes are involved in the predicate and what the meaning of the predicate is. Other common terms of relational modeling include tuple, and relation value. A tuple is a set of attributes expressed most often as a single row in a table. The attributes make up the columns of the table, and the table itself is classed under a heading or relation. A relation value is the aggregation of the tuples under the relation or heading.

There are well-known tools in the art for mapping object models to relational models. This approach is known in the art as object-to-relational mapping. Object modeling, as described above, describes a system of objects that have identity, behavior, and encapsulated state. Relational models, quite differently from object models, describe a system by information. Therefore, a RDBMS has no distinct way of representing any of the primary properties of object modeling. For example, tuples, or rows, have neither identity nor encapsulation. Tuple attribute values are pure values so they have neither identity nor state. The disparity between the two approaches in programming causes what is known as an impedance-mismatch in the art. Programmers must write an extensive amount of code in order to successfully map objects to tables and data in tables to objects. Moreover, mapping objects to tables and vice versa, depending on the method used, can cause performance disadvantages in terms of user access to the relational data. For example, the number of database accesses required to perform a certain task, as well as the number of read and write operations associated with a task will depend in part on the efficiency of a mapping schema chosen for the system.

Because of the challenges described above, attempts have been made to address the persistence layer of a software system in terms of object orientation by providing object-oriented database management systems (OODBMS) instead of middleware solutions. Object oriented databases attempt to eliminate the need for object-to-relational modeling but they have not been accepted for business applications due to lack of standards and major limitations.

There are also object/relational database management systems (ORDBMS) available in current art that provide features from both relational and object environs. ORDBMS do have the ability to handle complex information and have object-oriented facilities and capabilities included. They combine the scalability, reliability, and concurrency of a modem RDBMS with the data modeling features of an object-oriented system. However, this technology is also new and not widely used. Moreover many of the more complex and critical software systems are legacy systems that are not economically replaceable, nor migratable.

The above-described approaches with reference to provision of OODBMS and ORDBMS are immature in available functionality and have not gained even a moderate acceptance in the market place. RDBMS are still the most widely used data management conventions in the persistence layer of complex software systems. In view of the scant acceptance of OODBMS and ORDBMS technologies, it has become apparent that better ways of object-to-relational mapping are desirable and, more particularly, a more developer-friendly method of performing database accesses in an object oriented way is needed.

Object relational mapping tools are known and used to facilitate complex object to relation mappings that attempt to minimize impedance mismatch and also try to address performance disadvantages. Some of these tools can also generate code for simple primary key-based accesses to RDBMSs in an object-oriented way. However, standard predicates for such accesses are pre-defined and must be strictly observed.

There are certain other tools which allow users to specify a query for database access in structured query language (SQL) and wrap the query into a function that is usable in existing application processing code. However, these tools do not provide object-oriented views of the RDBMS to user code. Moreover, they do not take advantage of any specific code patterns that can be specified by a user at an object-modeling level. The challenge in current art is to be able to provide an object-oriented way to access a RDBMS using any arbitrary predicate without having to code for the access.

Therefore, what is clearly needed is a query-abstraction and code-generation process that addresses the above issues by exploiting the information captured in object models and in SQL in order to enable user-friendly access to an RDBMS based on any arbitrary predicate or non-typical primary key based data access method.

SUMMARY OF THE INVENTION

In a preferred embodiment of the present invention a control system for enabling user access of data records stored in a relational database in an object oriented way is provided, comprising a first object model representing a class mapped to a table in the relational database, a second object model representing a query object modeled after the first object model according to the same modeling framework, a software parser for reading the information contained in the first and second object models, a model generator for building a representative model from aggregated information from the first and second models, and a code generator for scanning the representative model and generating the appropriate application code for each node in the representative model. The system is characterized in that a user supplies the input parameters for accessing the records desired from the database into a text receptacle of the second object model and executes the model causing subsequent application code-generation processing that drives the access to the records in the ordered manner, the records served as an object or objects to a user program from which such records were retrieved in a fashion requested and interpretable by the user program.

In a preferred embodiment of the system the modeling language is Unified Modeling Language. Also in a preferred embodiment the query language is Structured Query Language. Further, in preferred embodiments the mapping schema is one to one class to table with replication in the subclasses. The second object may contain text options wherein if marked generate a method update or a method delete routine, and the modeling framework may support polymorphism with respect to object-to-relational mapping.

Further to the above, in preferred embodiments cursor, paging, and single row get methods are allowed, and access may be based on a primary key, or in some cases on an arbitrary predicate.

In another aspect of the invention a query object for accepting user input and facilitating automated object-oriented database accesses from a relational database is provided, comprising at least one input parameter supplied by a user, at least one output parameter returned by the query object, and at least one input instruction for generating method code for database access. This query object is characterized in that it manifests itself as a class object with operations in terms of user code generated such that execution of the query generates database access routines ordered by the query according to information of the class.

In preferred embodiments of the query object the modeling language is Unified Modeling Language, and user input is in Structured Query Language. The text receptacle may contain text options wherein, if marked, generate a specific data update method and/or a data delete method. The object may drive database access based on a primary key or on an arbitrary predicate.

In still another aspect of the invention a method for automatically generating application code for specific database access routines understood at a relational database, the routines called in an object-oriented way is provided, comprising steps of (a) providing a class object of data, the data represented and mapped to a table in the database; (b) providing a query object that manifests itself as the class object when executed; (c) supplying text input parameters to the query object, the parameters specifying the type of data and method of retrieval; (d) building a representative model from data contained in the class object and data contained in the query; (e) parsing the data from the representative object and generating the correct code for all represented nodes in the object; and (f) executing the code and returning the specified data from the database to a user interface according to access parameters supplied by the user.

In preferred embodiments of the method in step (a) the mapping is one to one class to table with replication in subclasses, and in step (b) the query object is of the same model framework as the class object. In step (c) the text input may be SQL. The text input may also include an option of data update or delete routines. In some cases in step (e) the code is application code for retrieving records according to class and query instructions.

In embodiments of the invention described below in enabling detail, for the first time a vastly-improved way is made available for accessing data in a relational database.

BRIEF DESCRIPTION OF THE DRAWING FIGURES

DESCRIPTION OF THE PREFERRED EMBODIMENTS

It is the object of the present invention to provide an object-oriented method for facilitating user access to a RDBMS according to any arbitrary predicate without requiring a user to write any code for access. The method and apparatus of the invention is described in enabling detail below.

Figure 1:
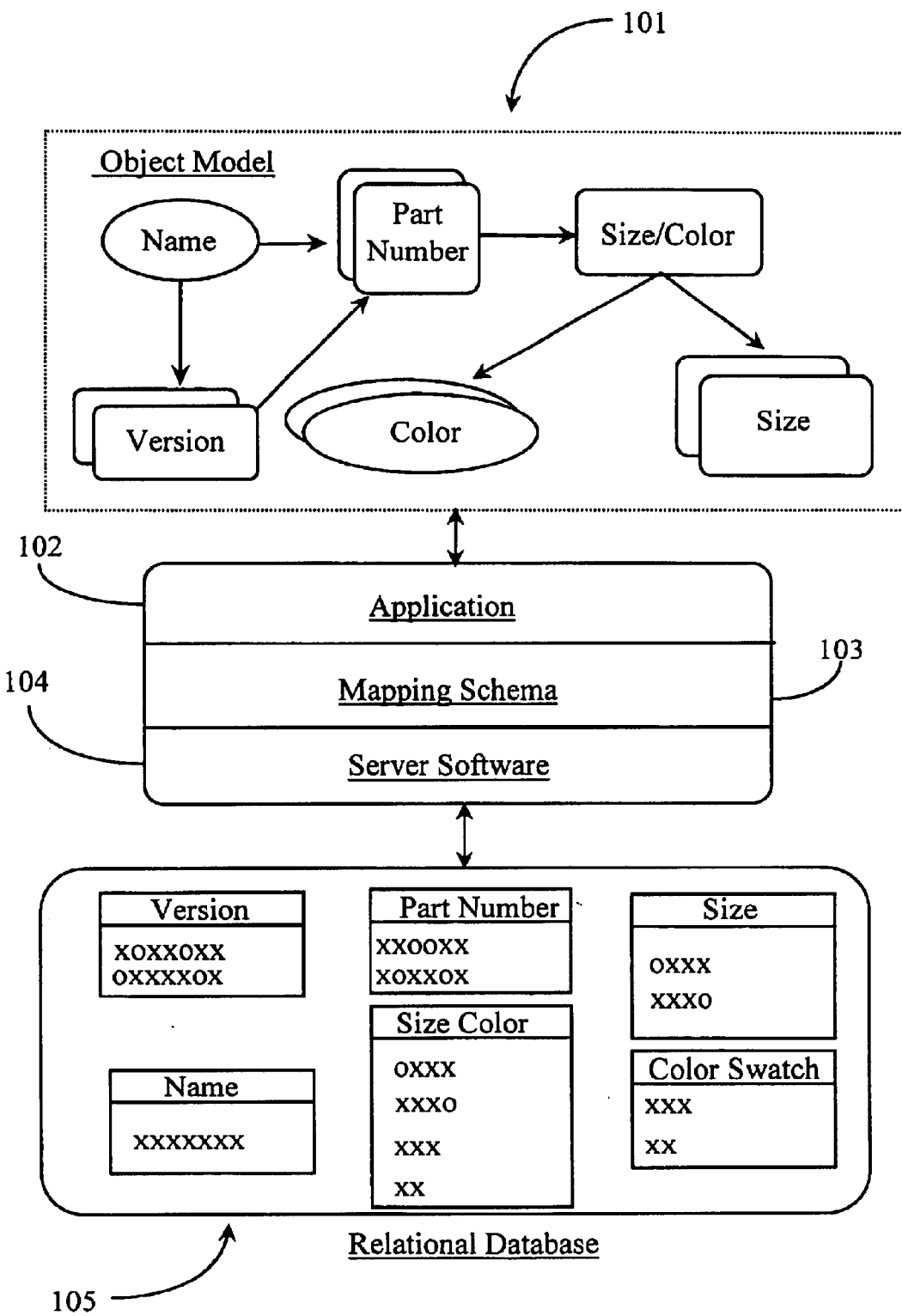
FIG. 1 is a block diagram illustrating components involved in object-to-relational mapping according to prior art.

FIG. 1 is a block diagram illustrating components involved in object-to-relational mapping according to the state of the art at the time of the present application. An object model 101 is illustrated in this example as a component of an object-oriented client application illustrated herein as application 102. More particularly, application 102 is composed of a plurality of object models, one of which is model 101. A bi-directional arrow illustrated between model 101 and application 102 is intended to point out the described relationship.

A mapping schema 103 is illustrated in this example as integrated to application 102. Mapping schema 103 represents a middleware layer as described in the background section. Mapping schema 103 provides mapping from existing objects such as model 101 to relational database schema that would be employed in a relational database illustrated herein as relational database 105. Database 105 represents the persistence layer described with reference to the background section above. A server software 104 is illustrated as in communication with database 105 and is considered in most embodiments as part of relational database 105. As such, server software 104 is also considered part of the persistence layer.

The components described above lend relation to the application layer, the middle layer, and the persistence layer of the represented software system. The presentation layer including GUI capability is not represented in the system illustrated in this example, but may be assumed to be present.

Object model 101 has a name illustrated herein as an ellipse labeled Name. Hierarchical attributes of model 101 include at least one version of the object name. In this example there are two separate versions of model 101 illustrated herein by 2 rounded rectangles closely associated, the topmost rectangle labeled Version. Each version of model 101 has an associated part number. This is illustrated as 2 rounded squares closely associated, the top most square labeled Part Number.

Further down the hierarchy a size/color object is illustrated by a rounded rectangle labeled Size/Color. This single object represents the size and color attributes of both part numbers of model 101. The attributes or properties of object Size/Color include those represented herein as 2 ellipses, the top most labeled color representing both available color options, and 2 rounded rectangles, the top-most labeled Size representing both size options. It is noted herein that these size and color options may also be interchangeable and are not necessarily constrained to certain part numbers or version numbers.

All of the attributes of model 101 must be represented in and accessible from relational database 105. In this example, there is a table for each type attribute and a tuple representing each specific option. In another embodiment, there may be a single table under a heading name, having columns representing attributes and tuples (rows) representing each possible option of order. The exact configuration depends upon the particular relational schema and mapping schema employed.

In order to access the information from database 105 in an object oriented way, a user must execute a database query that is based on a primary key and adheres to a predefined predicate that is already mapped and coded. If a user desires to access information in a non-standard way using a random or arbitrary predicate that is not already predefined, the user would not be able to do so without writing the code required to proceed successfully.

It is an object of the present invention to enable a user to access a RDBMS using any arbitrary predicate without requiring the user to code for access. In order to facilitate user access using an arbitrary or random predicate, a modeling framework is required that is symmetric in data structure and can be used in more than one level of abstraction. The inventor knows of a meta meta modeling framework comprising a base or root meta meta model at the highest level of abstraction, a meta model instance of the meta meta model, and a user or system model that specifies the user system. The meta meta model is used to build meta models that can be used in mapping schema and database access tasks.

In order to enable automatic code generation that is transparent to an accessing user in the case of non-standard database accesses, the modeling framework must be supported by an extensible, model-repository system that is meta-model driven. It will also be assumed herein that an object-to-relational mapping schema is specified in such a repository and can be used by a novel query-abstraction technique. That is, the query abstraction method of the present invention does not define its own mapping, rather, uses one that is already in place. In a preferred embodiment the mapping schema used is one to one class to table mapping with replication in subclasses. However, in other embodiments other mapping schemas may be used.

Figure 2:
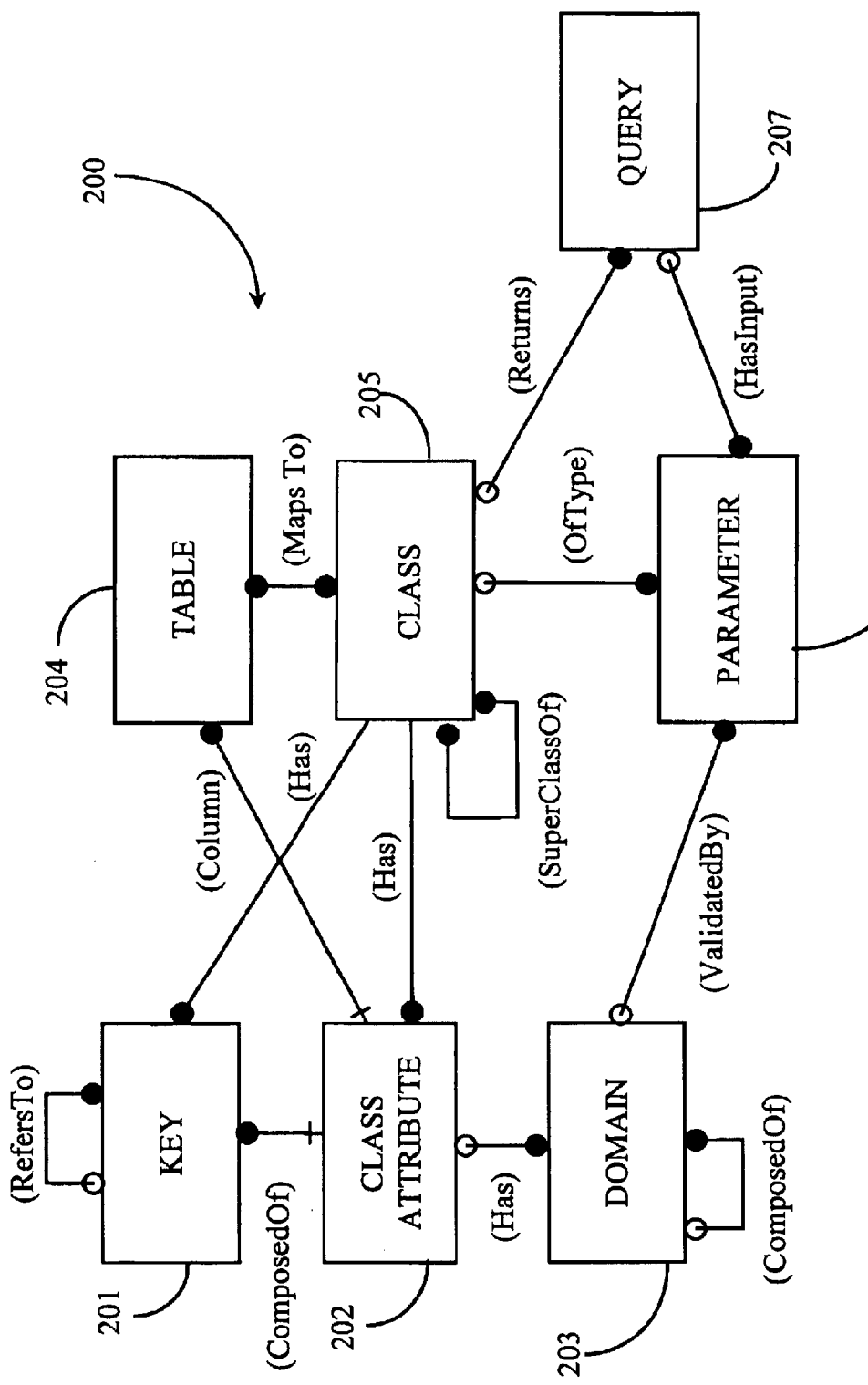
FIG. 2 is a block diagram illustrating a modeling structure for accessing a relational database according to an embodiment of the present invention.

FIG. 2 is a block diagram illustrating a meta modeling structure 200 for object-to-relational mapping and query abstraction according to an embodiment of the present invention. Meta model 200 illustrated in this preferred example has meta objects CLASS 205, CLASS ATTRIBUTE 202, and DOMAIN 203 that represent the object environment. Meta model 200 also has meta objects TABLE 204, and KEY 201 that represent the RDBMS environment. A novel meta object (model) QUERY 207 is provided in this embodiment and adapted to model arbitrary predicate selections from the RDBMS environment. QUERY object 207 has as input at least one PARAMETER 206 that represents a data type.

Meta associations between meta objects described herein are represented as annotated connector lines between the illustrated objects showing relationship between the entities. One with skill in the art will understand the Entity to Relational (E-R) meanings of the illustrated connector ends in terms of association parameters. Standard E-R connector ends and their meanings are herein identified below for convenience:

Connecting Line: illustrates relationship between the entities.

Rectangle: illustrates an entity.

Solid Circle End: 0 or many instances of the related entity are allowed in the relationship.

Empty Circle End: 0 or one instance of the related entity is allowed in the relationship.

End (Horizontal Intersect): One or many instances of the related entity are allowed in the relationship.

End (No Feature): Exactly one instance of the related entity is allowed in the relationship.

For example, CLASS 205 maps to TABLE 204 (0 or Many instances allowed for either entity). Likewise, TABLE 204 maps to CLASS 205. In this particular embodiment there are no associations made between separate classes. However, in some embodiments such associations may exist depending upon the mapping schema and modeling language used.

Other meta associations illustrated in this example are CLASS 205 has CLASS ATTRIBUTE 202; CLASS ATTRIBUTE 202 is a (column) in TABLE 204; CLASS 205 has KEY 201; KEY 201 is (Composed Of) CLASS ATTRIBUTE 202; CLASS ATTRIBUTE 202 has DOMAIN 203; KEY 201 refers to KEY 201; DOMAIN 203 composed of DOMAIN 203; and so on. These meta associations define the mapping schema for mapping object model 200 to a relational schema. The meta objects illustrated in this example all have meta properties that represent generation-specific design attributes. Specific meta properties that are leveraged by QUERY object 207 are listed below in the following description using syntax:

For MetaObject=CLASS; MetaProperties= PERSISTANCE_Type and VERSION_FLAG. PERSISTANCE_TYPE relates to whether the CLASS is a persistence class or a transient class expressed by the values P/T (Persistence/Transient) with the default=T or Transient Class. VERSION_FLAG relates to whether or not soft locking is required the option expressed by the values Y/N (Yes/No) with the default value=N.

For MetaObject=Table; There are no listed properties or values.

For MetaObject=ATTRIBUTE; MetaProperties=Optionality. Optionality relates to whether the attribute is optional or mandatory (Null or Not Null) as expressed by the values O/M (Optional/Mandatory) with the default=M.

For MetaObject=Query; MetaProperties=QUERY_TYPE; UpdateMethodReqd; and DeleteMethodReqd. QUERY_TYPE relates to whether the query is a simple single-row-select access method or a cursor-involved access method and has the following optional meta properties; C (CursorSelect), CP (Cursor&Paging), MC (MultirowCursor), P (Paging), PMC (Paging&MultirowCursor) and S (SimpleSelect) with no default values represented. In addition, MetaObject Query has a Name property and a Text property.

UpdateMethodReqd relates to whether or not any methods are required to update values and is expressed by the values Y/N (Yes/No) with the default value=N. DeleteMethodReqd relates to whether any methods are required to delete rows and is expressed by values Y/N (Yes/No) with the default value=N.

It is noted herein that the Query MetaProperty QueryName becomes the name of any existing or derived Class in which all of the methods of the particular Query are present. The Query MetaProperty QueryText is adapted as a receptacle for user-supplied SQL. The Query MetaProperty QueryType as expressed further above is used to generate the optional Query methods. In a preferred embodiment, code is automatically generated via a parser reading from a query specification and model information. Using this information, an internal representation (model) of the aggregated information is constructed using a model-based generative approach. The model is then scanned and code is supplied for each represented node in the representation. The code can be generated for different standard implementation technologies like open database connectivity (ODBC), java database connectivity (JDBC), or embedded SQL.

In general, Cursor methods are used to select multiple rows from the database and process them one after another till all the records are exhausted. Paging methods are typically used in user interfaces (UI) whereby a user is shown a certain, typically small, set of records from the database and depending on the user's selection criteria, the next size-equivalent set of records or the previous size-equivalent set of records are shown on a serial basis (one set per one access). This particular selection method aids in reducing data traffic from server to client since only a minimal set of records to be displayed are fetched from the database in any one access. Single Row Get is used when aggregate functions like SUM and COUNT are inserted in the SQL query text.

For MetaObject Parameter; There are no listed properties or values. For MetaObject Domain; MetaProperties=DataType and CompoundFlag. DataType relates to which type of data is present in the database and is expressed by the option values CHAR/Date/; NUMBER/; VARCHAR2/; and LONGRAW with no default value. CompoundFlag relates to whether Domain comprises other Domains or just a simple Domain expressed by values Y/N (Yes/No) with no default value.

For MetaObject Key; MetaProperties=KeyType. KeyType relates to which type a key is from two possible types, which are a Primary Key and an Alternate Key and expressed by the values P/A (Primary/Alternate) with no default value. It is noted herein that a primary key-based access returns only one uniquely defined object whereas a non-primary key-based access may return multiple objects that satisfy the predicate.

Referring now back to FIG. 2, query object 207 requires the following meta associations. Query Returns Class (M:1) where M=Many. Query Returns Class association identifies the structure of the output of the query. Query HasInput Parameter (1:M). Query HasInput Parameter association identifies the input parameters of the query. Other associations include Parameter Of Type Class (M:1) and Parameter Validated By Domain (M:1). The latter described associations define types for input and output of a query. They aid in providing type information.

The Query returns Class association is used whenever a user desires access to an RDBMS using a non-primary key. Under this access, paging, cursor access and complex select clauses resulting in a single row output are allowed. A query that is of cursor type can be tagged to generate update and/or delete methods, which in turn generate code for positioned update or delete functions.

The meta property Query Text of the meta object QUERY 207 contains the text of the query. Query text is entered as a SELECT statement with an INTO clause. Other sub-clauses for a SELECT statement may be optionally included. Syntax for structuring an SQL query is quite similar to standard SQL syntax with one major exception. In a preferred embodiment of the present invention, there is a difference in how the host variables are specified. For example, in standard SQL, input and output parameters are dependant on "host language". For example, the parameters are specified typically as ":host variable name". In a preferred embodiment of the present invention, the host variable is specified as ":n.<classname>.<attribute name>" or simply ":n.<classname>". In the preceding expressions n is a sequence number for a parameter. In the case of multiple parameters, the first parameter has n=1, the second parameter has n=2 and so on. Classname is the name of the class in the model and attribute name is the name of an attribute in the model.

In a preferred application of SQL according to an embodiment of the present invention, a classname or a qualified attribute name becomes a host variable wherein each variable is numbered. A user simply enters the input and output parameters for a query. The user also defines types for the parameters and only those parameters should be used in query text.

Figure 3:
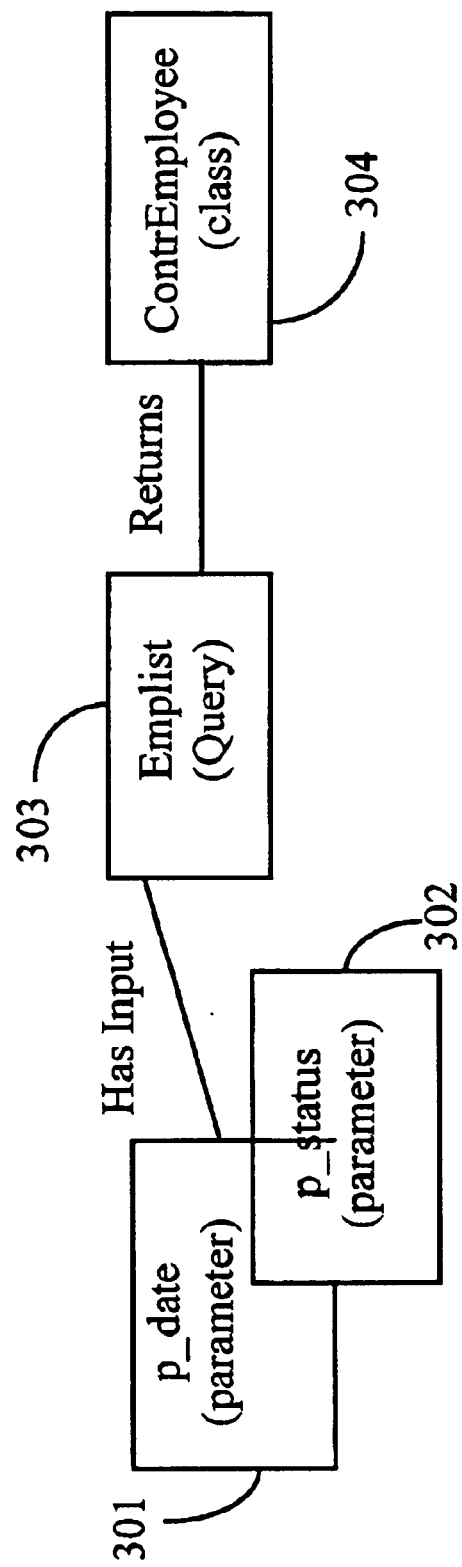
FIG. 3 is a block diagram illustrating the modeled structure of an SQL query according to an embodiment of the present invention.

FIG. 3 is a block diagram illustrating a user model 300 of an SQL query according to an embodiment of the present invention. Model 300 represents an employee list query (Emplist Query) 303 and it's meta properties and associations. Query 303 manifests itself as a class 304 in user code. Based on information in the model, various methods can be generated for the specified class. In this case, the class is contract employees (ContrEmployee) 304. The association Query Returns Class represents output of the query. Input of query 303 is represented herein by the parameters p_date 301 and p-status 302. Query 303 is therefore modeled as follows:

emplist Returns ContrEmployee
emplist HasInput p_date, p_status
p_date ValidatedBy d_date (d_date is of RDBMS type Date)
p_status ValidatedBy d_int (which is of RDBMS type Number)

Query text is entered as an embedded SELECT statement. A user can instantiate an object of this class and use it in an object oriented way in his or her code. An example of a query text for the query emplist 303 is presented in the syntax below:

SELECT EmpId, EmpName, EmpDept

```
INTO :3.ContrEmployee.EmpId,
     :3.ContrEmployee.EmpName,
     :3.ContrEmployee.EmpDeptId
FROM ContrEmp,
     Project
WHERE ContrEndDate—TO_DATE(:1.p_date,
     'YYYYMMDD')<10
AND EmpProject=ProjectId
AND ProjStatus=:2.p_status;
```

There are multiple options for generating various functions without requiring coding by a user. For example, if the query type (QueryType) is tagged with an S then Get ( ) function is generated. This option is used only if the query output is expected to be a single row.

If the query type is tagged with "C" for cursor operations, then Open ( ), Fetch ( ), and Close ( ) functions are generated. If the query type is marked "P" (Paging), then GetM( ), GetM_Fwd( ), and GetM_Bwd( ) functions are generated.

If the UpdateMethodReqd property is tagged with "Y" (Yes), then UpdateCursor ( ) function is generated. Likewise, if the DeleteMethodReqd property is tagged with "Y", then DeleteCursor ( ) function is generated. UpdateMethodReqd and DeleteMethodReqd should be marked "Y" only if the query type is a cursor type query. In all cases, the Open ( ) function will open the cursor for update.

In a preferred embodiment of the invention, host variables of a query in SQL text are represented as follows:
Host_var::=<N>.<class/domain name>.<attribute name>
In case of simple domains, the attribute name is not required. N is the serial number of a parameter, the parameter numbering starts with an input parameter. The first parameter is numbered 1, the second numbered 2, and so on. The output parameter gets the last serial number. Some examples of host variable are
:1.Employee.EmpId
:2.Address.Line1
:3.d_Date The parameter sequence or hierarchy within a query is determined by ordering of association (HasInput) in a given model. If parameter to query association assumes a different sequence (re-sequenced) in the model, then the associated query needs to be altered such that the sequence of the parameters of the query are changed to comply with that in the model.

It is noted herein that query types 'S' (single row get) and 'C' (Cursor) are mutually exclusive such that only one set of unique functions are generated for each. The following methods can be generated for a query.
Get (parameter1, parameter2. . . , object_var): Status This Get ( ) method is generated when the query type in the model is set to S (single row get). The method will accept as many parameters as are defined in the query, all of those being input parameters. Object_var is the object that the function returns. This method always returns a single object as query output. In one embodiment, the return value of this function can be a status for quick error checking.
Open (parameter1, parameter2, . . . , object_var): Status It is noted that Open, Fetch, and Close functions are interlinked and are generated when the query type is set to C (cursor type). The open method accepts as many parameters as are defined in the query, all of which are input parameters. Object_var is the object that would be returned by an associated fetch function described further below. More specifically, the open function opens a cursor to facilitate fetching of objects from an RDBMS according to a specified query. The return value of the function can, as described above, be a status for quick error checking.

Fetch (parameter1, parameter2, . . . , object_var): Status

This method accepts a different set of input parameters than the open method based on the query. As was described above, the object to be retrieved as specified in the query is the object_var, which is the output of the query. The return value of the function can be a status for quick error checking. This method fetches objects satisfying criteria specified in the query. It is assumed, of course, that a call to open method is executed before this method is called. Objects are fetched one by one.
Close (parameter1, . . . object_var): Status This method only accepts an error flag as an output parameter. The method closes the cursor that was opened as described above using the open method. The method returns any errors and any related information in an error object, which is an output parameter. Again, the return value of the function can be used as a status for quick error checking. The close method is called corresponding to each open method call.

In a preferred embodiment of the invention, objects within an RDBMS can be modified with Update or Delete functions.
Methods for object modification are as follows:
UpdateCursor (parameter1, parameter2, . . . object_var): Status The update cursor method is generated if the UpdateMethodReqd property of the query model is marked 'Y' (Yes) as was described further above in this specification. The update cursor method takes an object variable (object_var) as an input parameter. The method acts to update the object (supplied as object_var) in the RDBMS database. The return value of the function can be a status for quick error checking as described above with reference to other methods. It is assumed herein that this method is called after open and fetch methods are called. The method updates the last object fetched from the database.
DeleteCursor (parameter1, parameter2, . . . , object_var): Status This method is generated if DeleteMethodReqd property of the modeled query is marked Y (Yes). As was described above, the return value of the function can be a status for a quick error check. It is noted that this method is called only after open and fetch methods have been executed. This function deletes the last-fetched object from the database.

When a query type is set to P (paging) or CP (cursor & paging), there are methods called, in sequenced order, by the application for implementing a scrolling effect on a client's UI wherein just the optimum number of records are retrieved to fit within the operating GUI. Examples of such paging methods follow:
GetM (parameter1, parameter2, . . . , DynamicArray*object_var): Status This method is called as a first step toward display of a set of records in a scrollable window of an interfacing GUI. The actual number of records selected from and 5retrieved from the database depends on GUI design considerations and is pre-defined. GetM ( ) retrieves one extra row along with the specified number of records retrieved for GUI display. Subsequent calls are determined according to user interaction.
GetM_Fwd (parameter1, parameter2, . . . , ContObject, DynamicArray*Object_var): Status This method is called to retrieve a pre-defined set of records, which follow a logical sequence defined in the query from the record identified in the ContObject or Continuation Object. For example, if a user scrolls down, the application executes this method effectively retrieving a next set of records of substantially the same size parameters as the first set in a logical forward direction.

GetM_Bwd (parameter1, parameter2, . . . , ContObject, DynamicArray*Object_var): Status This method is executed when a user scrolls upward from an interfacing GUI. The Get_Bwd method retrieves a next set of records in a logical reverse direction from the Get_Fwd method. The actual direction is programmable.

In one embodiment, the query abstraction technique can be used to automatically generate methods for accessing associated objects in model. It is known that the UML model, for example, supports association between classes in model. It is desirable then to be able to access these associated classes through generated methods. Without SQL abstraction, accessing such an associated class would require a database join operation. In this embodiment, access methods can be modeled in terms of the meta model structure described above wherein a corresponding SQL text can be automatically generated from the model information. With these specifications, one can generate access methods in the same way that methods are generated for individual queries.

It will be apparent to one with skill in the art that any RDBMS access based on any arbitrary predicate can be made in an object-oriented fashion because of query manifestation as class in the model. It will also be apparent to one with skill in the art that the method of the present invention generates operations that support polymorphism, that is to say that any instance of a type (same type or derived type) modeled as an input or output parameter can be supplied to generated SQL queries.

It will further be apparent to one with skill in the art that code patterns for various operations are automatically generated based on existing model information such that a user does not have to write any code. All complex database access methods are available in model form so that it is much easier to conduct performance-related analysis tasks such as access path analysis.

The method and apparatus of the present invention can be used with typical On-Line Transaction Processing (OLTP) systems and can be adapted to differing implementation technologies such as ODBC, JDBC, and embedded SQL. Therefore the method and apparatus of the present invention should be afforded the broadest scope under examination. The spirit and scope of the present invention is limited only by the claims that follow.

What is claimed is:

1. A control system for enabling user access of data records stored in a relational database in an object oriented way comprising:

a first object model representing a class mapped to a table in the relational database;

a second object model representing a query object modeled after the first object model according to the same modeling framework;

a software parser for reading the information contained in the first and second object models;

a model generator for building a representative model from aggregated information from the first and second models; and a code generator for scanning the representative model and generating the appropriate application code for each node in the representative model;

characterized in that a user supplies the input parameters for accessing the records desired from the database into a text receptacle of the second object model and executes the model causing subsequent application code-generation processing that drives the access to the records in the ordered manner, the records served as an object or objects to a user program from which such records were retrieved in a fashion requested and interpretable by the user program.

2. The control system of claim 1 wherein the modeling language is Unified Modeling Language.

3. The control system of claim 1 wherein the query language is Structured Query Language.

4. The control system of claim 1 wherein the mapping schema is one to one class to table with replication in the sub-classes.

5. The control system of claim 1 wherein the second object contains text options wherein if marked generate a method update or a method delete routine.

6. The control system of claim 1 wherein the modeling framework supports polymorphism with respect to object-to-relational mapping.

7. The control system of claim 1 wherein cursor, paging, and single row get methods are allowed.

8. The control system of claim 1 wherein access is based on a primary key.

9. The control system of claim 1 wherein access is based on an arbitrary predicate.

* * * * *